Aug. 25, 1925.
R. A. WALKER ET AL
1,551,079
AUTOMATIC CUT-OFF VALVE MECHANISM
Filed May 12, 1922      2 Sheets-Sheet 2
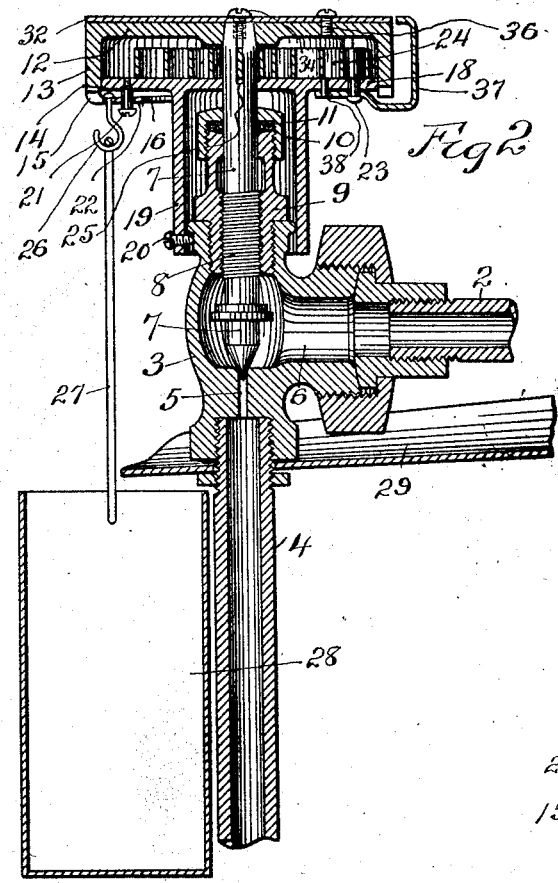
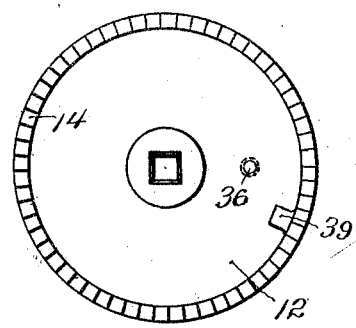
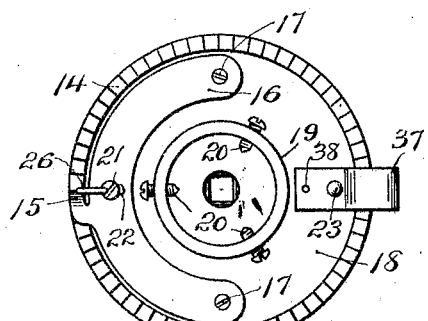
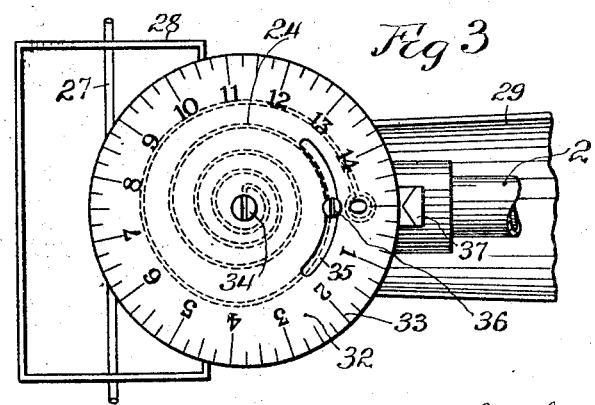
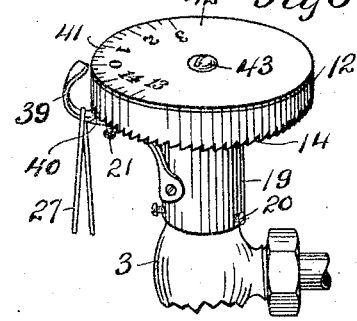
Richard A. Walker, INVENTORS
De Witt E. Neibel
BY
Warren D. House
Their ATTORNEY Patented Aug. 25, 1925.

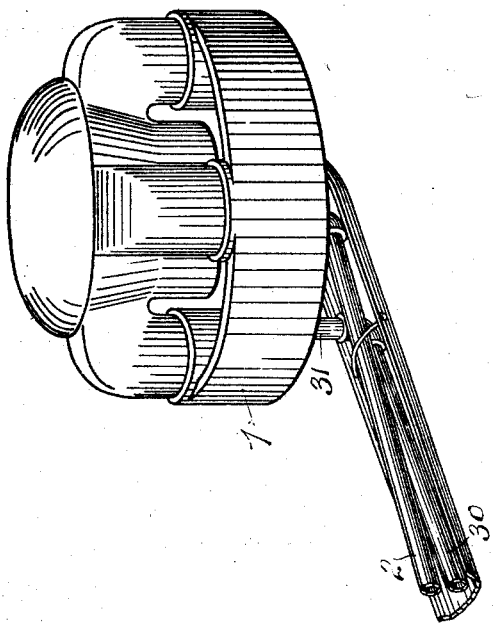
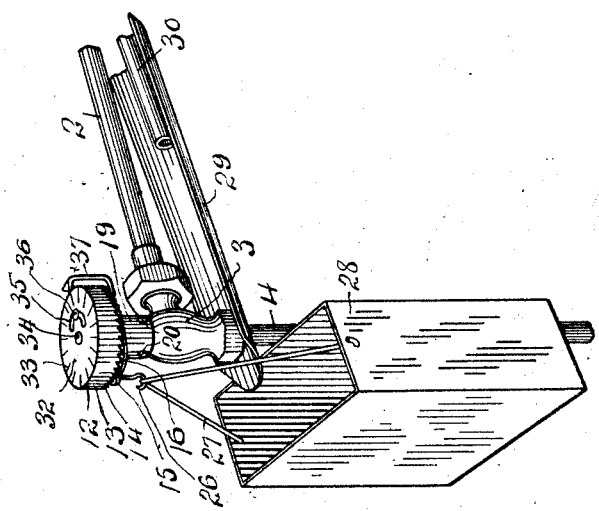

1,551,079

UNITED STATES PATENT OFFICE.

RICHARD A. WALKER AND DE WITT E. NEIBEL, OF KANSAS CITY, MISSOURI.

AUTOMATIC CUT-OFF VALVE MECHANISM.

Application filed May 12, 1922. Serial No. 560,299.

*To all whom it may concern:*

Be it known that we, RICHARD A. WALKER and DE WITT E. NEIBEL, citizens of the United States, residing at Kansas City, in the county of Jackson and State of Missouri, have invented a certain new and useful Improvement in Automatic Cut-off Valve Mechanisms, of which the following is a specification.

Our invention relates to improvements in automatic cut-off valve mechanisms.

It is particularly adapted for use in connection in oil burners.

One of the objects of our invention is to provide novel means for automatically cutting off the oil supply to a burner when the latter overflows or its flame becomes extinguished.

A further object of our invention is to provide novel means for automatically moving a valve from any open position to the closed position when a predetermined amount of liquid has been deposited in a receptacle, the weight of which with its contents controls closing operation of the valve.

A further object of our invention is to provide a mechanism of the kind described which is simple, cheap to make, which is efficient in operation, which is durable and not liable to get out of order, and which may be readily applied to valves and burners now in use.

Our invention provides further a novel adjustable mechanism arranged to be attached to a valve for indicating the position of the latter, and which is simple, cheap to make and which is adapted to be readily applied to rotary valves now in use.

The novel features of our invention are hereinafter fully described and claimed.

In the accompanying drawings, which illustrate the preferred embodiment of our invention, Fig. 1 is a perspective view, partly broken away, of our improved mechanism.

Fig. 2 is an enlarged vertical sectional view of the valve mechanism and parts connected therewith.

Fig. 3 is a plan view of what is shown in Fig. 2.

Fig. 4 is an under view of the valve head.

Fig. 5 is an under view of the spring, pawl and indicator shown mounted on the tubular supporting member which is shown in operative position in the valve head.

Fig. 6 is a perspective view of a modification in which the spring pawl serves also as the dial pointer.

Similar reference characters designate similar parts in the different views.

1 designates an ordinary oil burner which is attached to and supplied with oil by a conductor which includes a pipe 2, to one end of which is connected a valve casing 3, the lower end of which is connected to the upper end of a pipe 4, the other end of which is connected to a suitable source of oil supply, not shown.

The valve casing 3 has a vertical passage 5, Fig. 2, which at its lower end communicates with the pipe 4 and which at its upper end communicates with a passage 6, which communicates with the pipe 2.

Any suitable shut off valve may be used for closing the passage 4 to shut off the oil supply from the burner 1. In the drawing we have illustrated a valve having a vertical rotary stem 7, provided with a conical lower end adapted to enter and close the passage 5. The stem 7 has a screw threaded portion 8 fitted in an internally threaded bushing 9, which is externally threaded and fitted into the threaded upper end of the valve casing 3. The upper end of the bushing 9 is threaded and has fitted thereon a stuffing box 10, through which the stem 7 extends and in which is mounted packing material 11, which encircles the stem 7 and bears against the upper end of the bushing 9.

The upper end of the stem 7 is squared and has fitted thereon a circular hollow head 12, provided with an annular downwardly extending flange 13 the lower edge of which is provided a circular row of ratchet teeth 14, which is normally engaged by a releasable detent comprising, preferably, an arcuate spring 16, Figs. 2 and 5, which is disposed substantially horizontal and is secured adjacent to its ends, by screws 17, to the under side of an annular flange 18 extending from the periphery of an inverted cup-shaped supporting member 19, which encircles the upper end of the valve casing 3 to which it is secured by means of radial set screws 20 mounted in the side wall of the member 19.

The spring plate 16 is provided with an upwardly extending finger 15 which normally engages the ratchet teeth 14 and holds the valve head 12 and stem 7 from turning to the closed position, shown in Fig. 2.

A vertical screw 21 extends through a slot 22 in the plate 16 and has its upper end fitted in a threaded hole in the flange 18. The lower end of the screw 21 is provided with a head adapted to be struck by the under side of the spring plate 15 for limiting the downward movement of the latter after the finger 15 has been disengaged from the teeth 14.

The flange 18 is mounted in the head 12 and has mounted in it a vertical pin 23, to which is secured one end of a coil spring 24, preferably of convolute form, and which is mounted on the upper side of the member 19, and which has its other end mounted in a vertical slot 25, which is provided in the upper end of the stem 7.

The arrangement of the spring 24 is such that the spring will be wound when the valve stem 7 is turned toward the open positions, that is counter-clockwise, as viewed in Figs. 1 and 3.

When the valve head 12 is turned to the open positions, the spring pawl plate 16 through its finger 15 will hold the head and valve stem from being turned by the spring 24 to the closed position. In order that the finger 15 may be released automatically from the teeth 14, to permit the spring 24 to close the valve, there is mounted in and depending from the spring plate 16 a hook 26 on which is supported the bail 27 of a liquid receptacle comprising a can 28 having an open top over which is disposed the lower end of a trough 29 which extends upwardly under the burner 1 and which has disposed above and arranged to discharge into it an overflow pipe 30, Fig. 1, connected to an overflow drip pipe 31 mounted in the bottom of the burner and disposed so as to carry away overflow oil from the burner 1 and to discharge such oil into the trough 29.

The weight of the receptacle 28, bail 27 and hook 26 is insufficient to overcome the tension of the spring plate 16, so as to disengage the finger 15 from the teeth 14.

In the event of the overflow and discharge of oil into the receptacle 28 from the burner through the trough 29 to a predetermined amount, which will be sufficient to pull the plate 16 downwardly, so as to release the finger 15 from the teeth 14, the spring 24 will at once turn the head 12 and the valve stem 7 to the closed position, shown in Fig. 2, thus shutting off the supply of oil to the burner, and thus preventing the discharge of oil upon the floor with the consequent loss of oil and liability of fire.

For indicating the position of the valve, there is mounted on the top of the head 12 a circular dial plate 32, which is provided with a circular row of graduations 33, some of which are numbered.

The dial plate 32 is provided with a central hole through which extends a vertical screw 34, which is fitted in a threaded hole provided in the upper end of the stem 7.

The dial plate 32 is revoluble on the screw 34 with respect to the head 12. The dial plate 32 is provided with an arcuate slot 35 which is concentric with the screw 34 and which has extending through it a vertical screw 36, the lower end of which is fitted in a threaded hole provided in the head 12. The upper end of the screw 36 has a head which is adapted to bear against the top of the dial plate 32 for holding the latter in the position to which it may be adjusted on the head 12.

Co-operating with the graduations 33, of the dial plate, is indicating means which may comprise a pointer plate 37, the lower end portion of which is attached to the under side of the flange 18 by the pin 23 and a pin 38 mounted in the flange 18. The upper end of the plate 37 is pointed, the pointed end being disposed adjacent to the graduated peripheral portion of the dial plate 32.

To adjust the dial plate 32, the valve stem 7 is closed, after which the screw 36, is loosened and the dial plate is turned to a position in which the zero graduation will register with the pointed end of the indicating plate 37.

In the operation of the device, the valve head 12 is turned to any open position desired, which position may be known by the number of the graduation, which is indicated by the pointer plate 37. In the case of the overflow of the burner 1 to an amount which will cause the receptacle 28 to lower from the normal position shown in Fig. 2, the pawl finger 15 will be released from the teeth 14 and the spring 24 will close the valve in the manner already described.

In case of wear of the pointed end of the valve stem or of the valve seat, so as to change the zero position of the valve, with respect to the valve casing, and flange 18, the screw 36 is loosened and the dial plate 32 is then adjusted so that the zero graduation again registers with the indicating plate 37 when the valve is closed. The screw 36 is then tightened.

After the valve has been automatically closed, in the manner already described, the receptacle 28 has its bail 27 detached from the hook 26 after which the oil which has been discharged into the receptacle is discharged therefrom, following which the bail 27 is again suspended from the hook 26.

With the employment of the tubular member 19 having the radial set screws 20, the apparatus is adapted for use in connection with ordinary valve casings now on the market.

In order that the valve head 12 may not be revolved a full turn, the under side of the head may be provided with a lug 39, Fig. 4, which is located so that when revolved to the fully open position, it will strike against the portion of the spring 24 which encircles the pin 23, thereby preventing accidental or wilful turning of the valve beyond a pre-determined open position. Liability of damage to the spring or of the supply of too great an amount of oil to the burner is thus eliminated.

In Fig. 6, we have illustrated a modification in which the detent which comprises a spring plate 39 is attached at its lower end to the periphery of the supporting member 19 and which has a finger 40 normally engaging the ratchet teeth 14 and which has a pointed upper end disposed adjacent to and arranged to indicate the graduations 41 which are arranged in a circular row on the upper side of a circular horizontal dial plate 42, rotataby mounted on the clamping screw 43, which is fitted in the upper end of the valve stem 7 and which, when tightened, is adapted to clamp and hold the dial plate 42, in such position as it may be adjusted, to the valve stem 7.

The bail 27 which supports the receptacle 28 is supported on the spring detent 39.

A stop screw 21 similar in function to the one already described extends through and limits the downward movement of the detent 39 and is mounted in the flange 18, as already described.

When a pre-determined amount of oil is deposited in the receptacle 28, the weight of the oil and the receptacle 28 will pull downwardly the detent 39, thus releasing the finger 40 from the ratchet teeth 14, upon which the coil spring 24 will turn the valve to the closed position, in the same manner as has been described with reference to the form shown in Fig. 2. The dial plate 42 is preliminarily adjusted so that when the valve is closed, the pointed upper end of the detent 39 will register with the zero graduation.

In other respects, than as just described, the form of our invention shown in Fig. 6 corresponds in construction to that shown in Fig. 2.

We do not limit our invention to the structures shown and described, as modification, other than what is shown may be made, within the scope of the appended claim, without departing from the spirit of our invention.

What we claim is:—

In a mechanism of the kind described, a support, a rotary valve having ratchet teeth, a graduated dial plate attached to and rotatable with said valve, a spring for turning the valve to the closed position, a spring pawl attached to said support and normally engaging said teeth for holding the valve from turning to the closed position and arranged to indicate the graduations of said dial plate, and a receptacle carried by said pawl and normally ineffective for releasing the pawl from said teeth, and arranged to disengage the pawl from said teeth when a predetermined weight of material is deposited in said receptacle, substantially as set forth.

In testimony whereof we have signed our names to this specification.

RICHARD A. WALKER.
DE WITT E. NEIBEL.